United States Patent [19]

Bond

[11] Patent Number: 4,823,210

[45] Date of Patent: Apr. 18, 1989

[54] COPY PROTECTED DISK

[75] Inventor: Charles R. Bond, Milpitas, Calif.

[73] Assignee: Verbatim Corporation, Sunnyvale, Calif.

[21] Appl. No.: 639,733

[22] Filed: Aug. 13, 1984

[51] Int. Cl.$^4$ .................. G11B 15/04; G11B 5/86; G11B 19/04

[52] U.S. Cl. ...................... 360/60; 360/132

[58] Field of Search ............ 360/60, 15, 53, 132, 360/133

[56] References Cited

U.S. PATENT DOCUMENTS

| | | | |
|---|---|---|---|
| 3,551,608 | 12/1970 | Balink | 360/15 |
| 3,604,104 | 10/1971 | Hembrooke | 360/15 X |
| 3,963,865 | 6/1976 | Songer | 360/37.1 X |
| 4,040,099 | 8/1977 | Cook | 360/60 X |
| 4,086,634 | 4/1978 | Cook | 360/60 |
| 4,100,575 | 7/1978 | Morio et al. | 360/33 X |
| 4,325,089 | 4/1982 | Hsu | 360/60 X |
| 4,333,113 | 7/1982 | Kalinowski | 360/27 |
| 4,462,078 | 7/1984 | Ross | 364/300 |
| 4,477,848 | 10/1984 | McWhirter et al. | 300/60 |
| 4,488,176 | 12/1984 | Bond | 358/319 X |
| 4,584,641 | 4/1986 | Guglielmino | 360/60 X |
| 4,644,422 | 2/1987 | Bedini | 360/60 |
| 4,734,796 | 3/1988 | Grynberg | 360/60 |

FOREIGN PATENT DOCUMENTS

| | | | |
|---|---|---|---|
| 0129427 | 12/1984 | European Pat. Off. | 360/60 |
| 54-58012 | 5/1979 | Japan | 360/60 |
| 1529939 | 10/1978 | United Kingdom | 360/60 |
| 2112971 | 7/1983 | United Kingdom | 360/60 |
| 2131580 | 6/1984 | United Kingdom | 360/60 |

OTHER PUBLICATIONS

IBM-TDB vol. 21, No. 2, Jul. '78, Gurugé Preventing Unauthorized Access to Diskette Loaded Microcode, pp. 836-837.

Primary Examiner—Stuart N. Hecker
Assistant Examiner—Alyssa H. Bowler
Attorney, Agent, or Firm—Dennis P. Monteith

[57] ABSTRACT

A copy protected magnetic storage disk includes a plurality of record tracks suitable for recording information-bearing data accompanied by a clock signal having a signal strength corresponding to the signal strength of the data. At least one of the record tracks includes a recording pattern representative of a code burst derived by temporarily changing the clock signal during a recording operation. Upon playback, the recording pattern of the code burst causes a random series of playback data to be produced which are dissimilar from one playback operation to the next playback operation. To verify the status of a disk (original or a copy), the code burst is read twice. With an original disk, the playback data is dissimilar; each time a copy is read, however, the same playback data is produced.

7 Claims, 4 Drawing Sheets

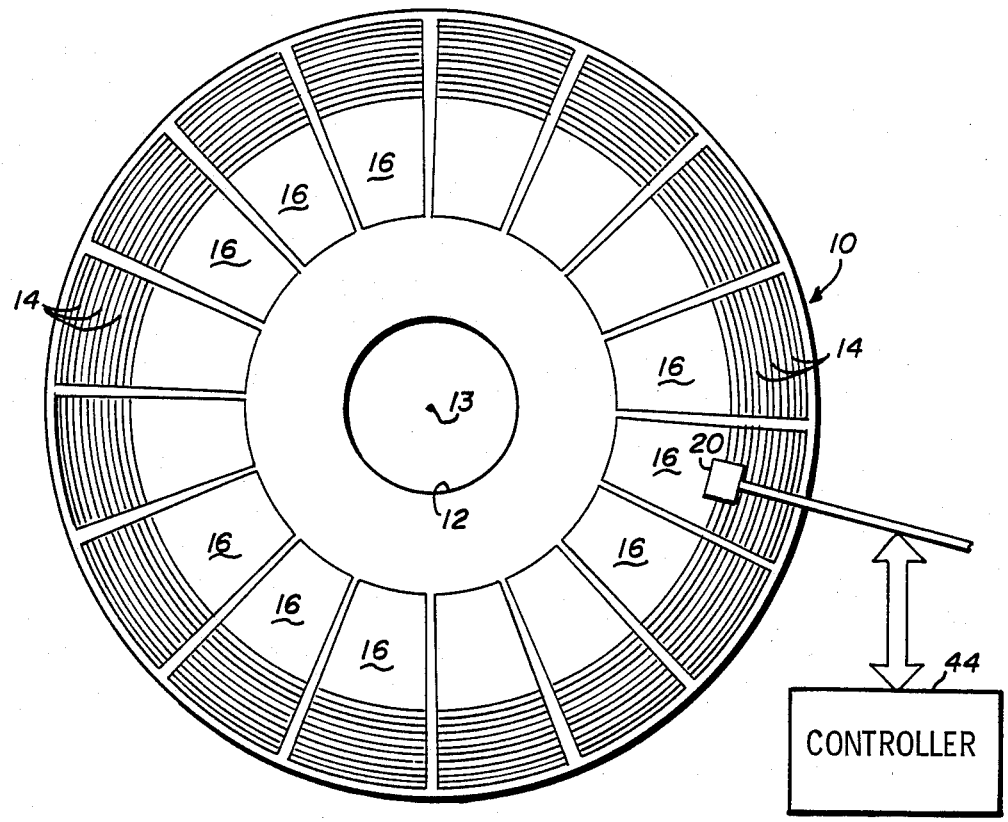
Fig_1
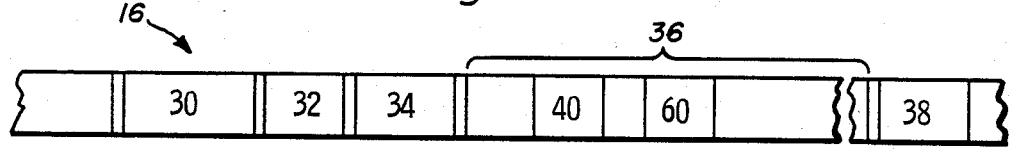
Fig_2
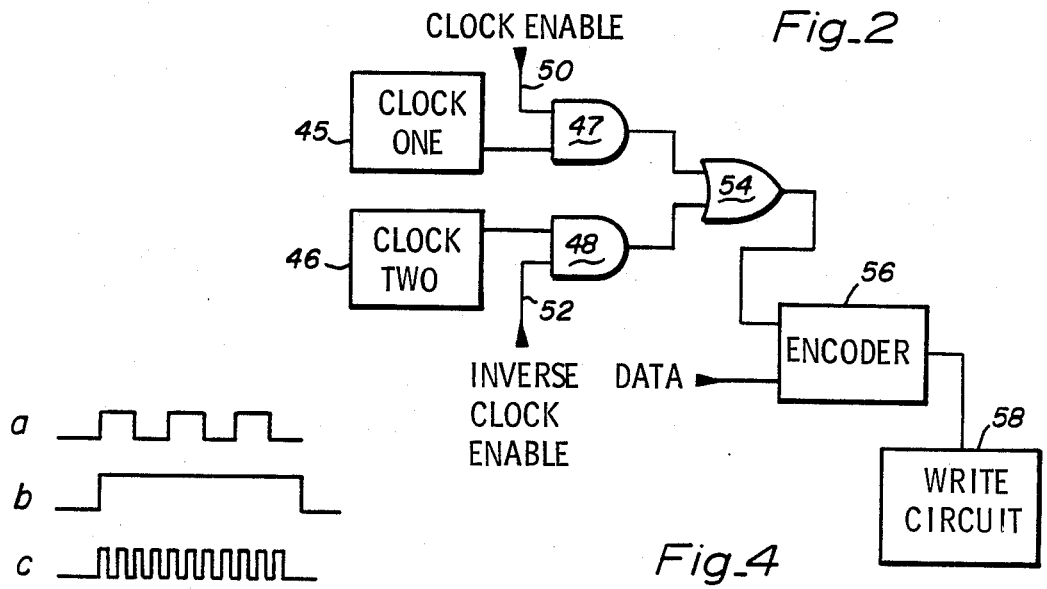
Fig_4
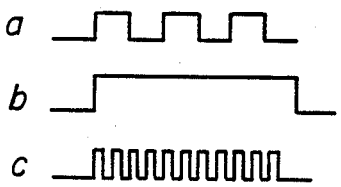
Fig_3

COPY PROTECTED DISK

BACKGROUND OF THE INVENTION

1. Field of the Invention

The present invention relates generally to magnetic disk data storage media and more particularly to disk data storage media which contain uncopyable sequences of encoded data.

2. Description of the Prior Art

Personal or microcomputers are increasingly employed in a variety of applications in the home, business, scientific and educational environments. Typically, such computers store data on and retrieve data from disk storage media. Flexible disk storage media are most commonly used in conjunction with such microcomputers, although hard disk media may be employed as well. Designing, manufacturing and marketing of applications software, written onto such disks, is a major industry, accounting for millions o dollars in sales annually. Manufacturers expend substantial sums of money on the development of such programs, often only to see them copied by unauthorized "pirates". Further, particular disks produced in-house containing proprietary, confidential or otherwise sensitive information may require copy protection and/or permanent identification.

Various means of protecting and/or identifying certain types of information stored on various types of storage media are known in the art. However, these means are generally complex and require special equipment or are not adaptable to flexible data storage disks, or both. U.S. Pat. No. 4,333,113 issued to Kalinowski describes a method for monitoring the reproduction of sound or audiovisual recordings by coding auxiliary information in a limited frequency range and superimposing it on the primary information. This method does not actually protect against copying the master because the master having the auxiliary information can be copied using ordinary duplication techniques. U.S. Pat. No. 4,325,089 issued to Itsu describes a method for safeguarding data which is merely a means of magnetically destroying the data upon attempts to gain unauthorized access. Such device has limited use as the data becomes unreadable to the intended user, as well as the unauthorized user, and requires that the data be maintained within the apparatus of the invention.

U.S. Pat. Nos. 4,086,634 and 4,040,099 issued to Cook both relate to a method and apparatus for detecting tape piracy by preparing the program source material to include preselected inaudible signals to indicate the origin of the material in a manner similar to Kalinowski or to produce unacceptable interference signals to spoil the copy. U.S. Pat. No. 3,551,608 issued to Balint describes a method and apparatus for recording a plurality of copies from a master audio sound track, and for checking the quality of the copies relative to the master.

U.S. Pat. No. 3,004,104 issued to Hembrooke discloses a method and apparatus for the identification of signals, in order to positively identify the origin thereof. Hembrooke, like much of the art, relies on encoding an inaudible signal in a narrow frequency band. U.K. Patent Application No. 2,055,501A, submitted by Edmunds discloses an apparatus specifically for the purpose of producing video tapes which cannot be copied on an ordinary video tape recorder.

Other methods to copyproof disks currently known in the art include the use of weak signal pulses to interfere with the nominal transitions encoded onto a data track. Such a technique has been disclosed by an article appearing in *Electronics,* Sept. 22, 1983, entitled "Disk-Drive Generated Pulses Foil Piracy". This technique requires special equipment to generate the weak pulses, and may not operate at all when used on a drive with automatic gain control. Attempts have been made to provide a disk with a permanent serial number for positive identification by using high-coercivity media and special recording apparatus. These have been unsuccessful thus far.

In view of the prior art, there remains a need for a method of electronically identifying magnetic data storage media, and for providing a simple, positive means to differentiate a copy of the data from the original whereby valuable information stored on the media may be safeguarded.

SUMMARY OF THE PRESENT INVENTION

It is therefore an object of the present invention to provide an improved data storage disk which contains a tamper resistant serial number.

It is a further object of the present invention to provide a copy-protected data storage disk which, if copied, will produce a copy having a detectable signature.

It is a further object of the present invention to produce a tamper resistant and copy-protected data storage medium which may be produced with existing recording and duplication equipment.

It is a further object of the present invention to provide a tamper resistant and copy-protected data storage medium which does not require drive modification.

It is a further object of the present invention to provide a tamper resistant and copy-protected data storage medium which is not susceptible to failure when used on a drive with automatic gain control.

Briefly, a preferred embodiment of the present invention includes a flexible magnetic data storage disk having at least one specially encoded data pattern comprising a "burst" located in at least one disk sector. This code burst comprises a nonstandard recording pattern which is designed to differ from the nominal transitions usually present on a data track and to interfere with normal reading of the data. Without the nominal transitions, the read electronics "drifts" and interprets the code burst as a random series of ones and zeros. To verify the status of the disk as an original, the sector containing the code burst is read twice, and the data generated therefrom is compared. The original disk will produce random data each time the burst is read, thus the resultant data will be dissimilar. A copy however will, on successive readings, produce the same data from the sector containing the code burst. This result follows from the nature of the duplicating process wherein the copy is produced by reading the original and writing the copy therefrom. The code burst will thus be interpreted and fixed on the copy such that each time the copy is read, the same data will be produced.

For certain security applications, a serial number may be encoded onto the disk immediately following the code burst. The serial number will be tamper resistant because any attempt to rewrite the number will necessarily erase the code burst. Thus, a check for the presence of the code burst will automatically verify the integrity of the serial number.

It is an advantage of the present invention that a data storage disk may be produced carrying a tamper resistant serial number.

It is another advantage of the present invention that a data storage medium may be produced having a data signature which cannot be copied.

It is another advantage of the present invention that the data storage disk may be produced using standard recording and duplication equipment.

It is another advantage of the present invention that no modification of a disk drive is necessary to verify the data patterns.

It is another advantage of the present invention that the data storage disk may be used with drives having automatic gain control without loss of the code bursts.

These and other objects and advantages of the present invention will no doubt become apparent to those skilled in the art after having read the following detailed description of the preferred embodiment as illustrated by the various drawing figures.

IN THE DRAWING

FIG. 1 is a top view of a flexible magnetic recording disk of the present invention;

FIG. 2 is a schematic graphical representation of a sector of the disk of the present invention;

FIG. 3 is a schematic showing coding and clocking information; and

FIG. 4 is a schematic logic circuit used to achieve the code bursts of the present invention.

DETAILED DESCRIPTION OF THE PREFERRED EMBODIMENT

FIG. 1 illustrates a flexible data storage disk of the present invention and referred to by the general reference character 10. The disk 10 includes a central mounting aperture 12 which is coaxial with a disk central axis 13. A plurality of data tracks 14 are concentrically arrayed about the disk 10 coaxial with the axis 13. Typically there are forty data tracks 14 although there may be any lesser number of data tracks 14 and there can be a greater number to some extent, depending on the desired track density. The disk 10 may further be divided into a plurality of sectors 16 which are bounded about two sides thereof by concentric circular lines and about an additional two sides by radial lines projecting from the axis 13. The disk 10 is divided into sixteen sectors but this number can vary, for example, ten, twelve, twenty-four or thirty-six sectors are commonly used in the art, and all are consistent with the present invention. The tracks 14 and sectors 16 are schematically illustrated in FIG. 1, which also illustrates a read/write head 20 positioned over the disk 10.

FIG. 2 illustrates in schematic view, a portion of an individual sector 16, with the data track 14 represented as a continuous address header 30 followed by a gap 32, a data sync gap 34, a data field 36 and an epilog 38.

Near the beginning of the data field 36 is a code burst 40 which comprises a series of encoded information, approximately twenty bytes long, which differs from the nominal transitions normally present in encoded information. The code burst 40 is a "hard" bit recorded at normal signal strength, nevertheless, it is adapted to produce patterns that are beyond the ability of a disk controller chip 44, illustrated schematically in FIG. 1, to recover accurately. Thus, each time the code burst 40 is read by the read/write head 20, the magnetic impulses generated by the controller chip 44 differ from the impulses generated by a previous reading. Any attempts to copy the disk 10 will copy the code burst 40 as interpreted by the duplicating equipment used to make the copy. The data resulting from a copy of the code burst 40 will thus be fixed, and will so remain each time the copy is read. This provides a secure read-only signature to distinguish the original disk 10 from a copy thereof. The data on data field 36 cannot be written over without also writing over and destroying the code burst 40 because all of the disk controller chips 44 presently employed are limited to writing only, once switched to the write mode. Thus, by twice reading and comparing the recovered data, the disk 10 can be verified as an original.

The code burst 40 is generated by encoding in such a way as to interfere with the nominal transitions occurring on a data track 14. Various methods may be employed to do this. In the disk 10 the code burst 40 is generated by altering a clock frequency to be much higher or much lower than normal to eliminate the normal sequence of transitions which is interpreted by the controller chip 44 as a binary sequence of ones and zeros.

FIG. 3 is a schematic time chart showing (a) a normal series of uniformly spaced clock pulses, (b) a long-duration clock pulse for a code burst 40 of the present invention, and (c) a series of short duration clock pulses for a burst 40 of the present invention.

FIG. 4 is a schematic circuit diagram designed to produce the code burst 40 clock pulse of FIG. 3b. Processing events taking place within the computer are controlled by a clock signal, comprising a sequence of regular, periodic pulses or transitions, as illustrated in FIG. 3a. These clock pulses may be physically written adjacent to a series of data pulses, or if a self-clocking code is used, the clock pulses are written within the data pulses, and special coding rules are employed to differentiate the two. The circuit of FIG. 4 includes a first clock 45 for generating a normal series of transitions, and a second clock 46 having a frequency of, for example, one tenth that of clock 45, for generating the code burst 40. The output of each clock 45 and 46 is coupled to a first AND gate 47 and a second AND gate 48, respectively. One AND gate, for example AND gate 47 has a clock enabling signal 50 coupled to its other input. The other AND gate, for example, AND gate 48 has coupled to its other input an inverse clock enabling signal 52. The signals 50 and 52 are generated by appropriate software (not shown) and are complementary to each other such that when one AND gate is enabled, the other is disenabled. The outputs of the AND gate 47 and AND gate 48 are coupled to an OR gate 54 which is connected in turn to a clock input of an encoder 56. The encoder 56 may be any circuit known in the art for accepting clock and data pulses, and producing a signal therefrom which may be encoded on the disk 10. The output of the encoder 56 controls a write circuit 58 to produce either normal clock pulses or the nonstandard pulses of the code burst 40. This modification of the clocking may be used with both self-clocking and non self-clocking coding schemes.

An alternative method of creating the code burst 40 utilizes a direct current (DC) erase to produce a single, long duration pulse as illustrated in FIG. 3b. Such a pulse is the equivalent of a pulse produced using the clock 46 having a much lower frequency than that of the clock 45.

A number of special data storage applications would greatly benefit from a disk 10 having an indelible serial number encoded within the data tracks 14. Such a disk would be useful in applications demanding some degree of security, for example, in home banking, where a bank's computer needs to verify the particular disk to which it is downloading information. Such a system offers a much greater degree of security than a system employing a password, which is relatively easy to discover. For such applications, a serial number 60, illustrated in FIG. 2, is encoded into the data field following the code burst 40. The serial number may be encoded and written on the disk 10 by any means known in the art, and it is written to closely follow the code burst 40. The presence of the code burst 40 ensures the integrity of the serial number 60 which follows, because rewriting the serial number would necessarily require erasing the code burst 40.

The code burst 40 and serial number 60 may be placed on any one sector or plurality of sectors 16 of the disk 10 depending on the needs of the end user. While multiple code bursts 40 are easily added to the disk 10, a single burst 40 is generally all that is needed to obtain the desired security. The use of multiple bursts 40, however, lends itself to another application. The disk 10 may have, for example, four code bursts 40 located about four different sectors 16. Appropriate software (not shown) may be designed for the disk 10 so that each time the disk is run, one of the bursts 40 will be written over. The software includes instructions so that each time the disk 10 is rebooted, it will search for the first random data pattern, and verify it by successive readings. After the disk 10 has been run four times, no code bursts 40 remain, and the software refuses to run. In this instance, the code bursts 40 are being used as "tickets" to allow a predetermined number of runs. Providing the disk 10 with multiple code bursts 40 and utilizing it in combination with the appropriate software would allow businesses engaged in renting disks containing particular applications software to charge by the number of runs, rather than by time.

While the disk 10 has been described in terms of a flexible, or "floppy" disk, it should be noted that the disk of the present invention may be a hard disk as well.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. In a copy protected magnetic storage disk having a magnetic recording layer including a plurality of record tracks suitable for recording information-bearing data accompanied by a clock signal comprising a sequence of uniformly spaced pulses having a signal strength comparable to the signal strength of the information-bearing data, the clock signal being represented on a magnetic recording layer of a magnetic disk by a series of transitions that occur at the frequency of the clock signal pulses, the improvement comprising:

(a) at least one of the record tracks including a control pattern of magnetic transitions, recorded at a predetermined location on the recording layer of the disk, representative of a code burst derived by temporarily changing the frequency of the pulses of the clock signal during a recording operation, the frequency of the transitions of the control pattern being beyond the frequency capability of an associated playback device, to cause, in response to the playing back of the control pattern, random playback data to be produced which are dissimilar from one playback operation to the next playback operation;

(b) the recording layer including a plurality of radially arrayed sectors wherein the code burst follows a data sync gap in a predetermined recording track of one of said sectors; and (c) a serial number is encoded about the predetermined recording track following the code burst.

2. In a copy protected magnetic storage disk having a magnetic recording layer including a plurality of record track suitable for recording information-bearing data accompanied by a clock signal comprising a sequence of uniformly spaced pulses having a signal strength comparable to the signal strength of the information-bearing data, the clock signal being represented on a magnetic recording layer of a magnetic disk by a series of transitions that occur at the frequency of the clock pulses, the improvement comprising:

(a) a plurality of control patterns of magnetic transitions, located at different but predetermined portions of at least one of the record tracks, each of the control patterns being representative of a code burst derived by temporarily changing the frequency of the pulses of the clock signal during a recording operation, the frequency of the transitions of each control pattern being beyond the frequency capability of an associated playback device to cause, in response to the playing back of each control pattern, random playback data to be produced which are dissimilar from one playback operation to the next playback operation;

(b) the information-bearing data including a software program designed to sense the presence of each of the bursts by the random data generated therefrom, the software program further being designed to have one burst erased each time the program is run, whereby the bursts act as tickets allowing the program to run only a preselected number of times.

3. In a copy protected master disk having a magnetic recording layer including a plurality of record tracks suitable for recording information-bearing data accompanied by a standard clock signal comprised of a series of predetermined pulses having a signal strength comparable to the signal strength of the information-bearing data, the clock signal being represented on a recording layer of a magnetic disk by a series of transitions that occur at the frequency of the clock pulses, the improvement comprising:

at least one of the record tracks including a control pattern of magnetic transitions, recorded at a predetermined location on the recording layer of the disk, representative of a code burst derived by temporarily changing the frequency of the standard clock signal during a recording operation, the frequency of the transitions of the control pattern causing, upon playback of said master disk, random playback data to be produced which are dissimilar from one playback operation to the next playback operation.

4. The master disk of claim 3 wherein,
    said recording layer is a flexible disk.

5. In a copy protected master disk having a magnetic recording layer including a plurality of record tracks suitable for recording information-bearing data accompanied by a signal comprising a train of uniformly spaced clock pulses having a signal strength comparable to the signal strength of the information-bearing data, the clock signal being represented on a magnetic recording layer of a magnetic disk by a series of transitions that occur at the frequency of the clock pulses, the improvement comprising:

at least one of the record tracks comprising a recorded control pattern of relatively constant amplitude, at a predetermined location on the recording layer of the disk, representative of code burst derived by temporarily overriding a number of the clock pulses by producing a single, relatively long duration signal of substantially constant amplitude during a recording operation, the control pattern having an effective frequency characteristic that is less than the frequency response of an associated playback device, to cause random playback data to be produced which are dissimilar from one playback operation to the next playback operation.

6. In a copy protected master disk having a magnetic recording layer including a plurality of record tracks suitable for recording information-bearing data accompanied by a standard block signal comprising a sequence of uniformly spaced pulses having a signal strength comparable to the signal strength of the information-bearing data, the clock signal being represented on a magnetic recording layer of a magnetic disk by a series of transitions that occur at the frequency of the clock pulses, the improvement comprising:

at least one of the record tracks including a control pattern of magnetic transitions, recorded at a predetermined location on the recording layer of the disk, representative of a code burst derived by temporarily increasing the frequency of the pulses of the standard clock signal, the frequency of the transitions of the control pattern being greater than the frequency response of an associated playback device, to cause random magnetic playback impulses to be produced which are dissimilar from one playback operation to the next playback operation.

7. A method for producing a copy protected master disk having a magnetic recording layer including a plurality of record tracks having information-bearing data accompanied by a clock signal comprising a sequence of predetermined pulses having a signal strength comparable to the signal strength of the information-bearing data, the clock signal being represented on a magnetic recording layer of a magnetic disk by a series of transitions that occur at the frequency of the clock pulses, said method comprising:

recording in a predetermined location on at least one of the record tracks a control pattern of magnetic transitions representative of a code burst derived by temporarily altering the frequency of the pulses of the clock signal, the frequency of the transitions of the control pattern being outside the frequency response of an associated playback device, to produce random playback data which are dissimilar from one playback operation to the next playback operation.

* * * * *